United States Patent [19]

Kucera

[11] Patent Number: 4,674,066
[45] Date of Patent: Jun. 16, 1987

[54] TEXTUAL DATABASE SYSTEM USING SKELETONIZATION AND PHONETIC REPLACEMENT TO RETRIEVE WORDS MATCHING OR SIMILAR TO QUERY WORDS

[75] Inventor: Henry Kucera, Providence, R.I.

[73] Assignee: Houghton Mifflin Company, Boston, Mass.

[21] Appl. No.: 835,659

[22] Filed: Mar. 3, 1986

Related U.S. Application Data

[63] Continuation-in-part of Ser. No. 750,911, Jul. 1, 1985, which is a continuation-in-part of Ser. No. 699,202, Feb. 5, 1985, and a continuation-in-part of Ser. No. 467,834, Feb. 18, 1983.

[51] Int. Cl.⁴ .......... G06F 5/00; G06F 11/00; G06F 15/00
[52] U.S. Cl. .......... 364/900; 364/411; 400/63
[58] Field of Search ... 364/200 MS File, 900 MS File, 364/419; 400/63, 83, 61, 67; 381/43

[56] References Cited

U.S. PATENT DOCUMENTS

| | | | |
|---|---|---|---|
| 3,568,156 | 3/1971 | Thompson | 364/300 |
| 3,704,345 | 11/1972 | Coker | 381/44 |
| 3,760,355 | 9/1973 | Bruckert | 340/146.2 |
| 3,969,698 | 7/1976 | Bollinger | 382/40 |
| 3,995,254 | 11/1976 | Rosenbaum | 340/146.3 WD |
| 4,010,445 | 3/1977 | Hoshino | 340/146.3 WD |
| 4,041,467 | 8/1977 | Cota | 364/900 |
| 4,068,301 | 1/1978 | Ishino | 364/200 |
| 4,081,607 | 3/1978 | Vitols | 381/45 |
| 4,096,934 | 6/1978 | Kirmser | 400/110 |
| 4,136,395 | 1/1979 | Kolpek | 364/518 |
| 4,145,739 | 3/1979 | Dunning | 364/200 |
| 4,156,868 | 5/1979 | Levinson | 381/43 X |
| 4,181,813 | 1/1980 | Marley | 381/44 |
| 4,181,821 | 1/1980 | Pirz et al. | 381/43 |
| 4,270,182 | 5/1981 | Asija | 364/900 |
| 4,284,846 | 8/1981 | Marley | 381/43 |
| 4,336,421 | 6/1982 | Welch et al. | 381/43 |
| 4,342,085 | 7/1982 | Glickman | 364/300 |
| 4,355,302 | 10/1982 | Aldefeld | 340/146.3 Q |
| 4,355,370 | 10/1982 | Yanagiuchi | 364/900 |
| 4,355,371 | 10/1982 | Convis et al. | 364/900 |
| 4,373,192 | 2/1983 | Yanagiuchi | 364/419 |
| 4,383,307 | 5/1983 | Gibson, III | 364/900 |
| 4,400,828 | 8/1983 | Pirz | 382/30 |
| 4,435,617 | 3/1984 | Griggs | 381/44 |
| 4,456,969 | 6/1984 | Herzik | 364/900 |
| 4,471,459 | 9/1984 | Dickinson et al. | 364/900 |
| 4,484,305 | 11/1984 | Ho | 364/900 |
| 4,495,566 | 1/1985 | Dickinson | 364/200 |
| 4,498,143 | 2/1985 | Strzelecki | 364/900 |
| 4,498,148 | 2/1985 | Glickman | 364/900 |
| 4,499,553 | 2/1985 | Dickinson | 364/900 |
| 4,507,750 | 5/1985 | Frantz | 364/419 |
| 4,566,065 | 1/1986 | Toth | 364/300 |
| 4,567,606 | 1/1986 | Vensko et al. | 381/43 |
| 4,581,756 | 4/1986 | Togawa et al. | 381/43 |

FOREIGN PATENT DOCUMENTS

| | | |
|---|---|---|
| 0175074 | 10/1983 | Japan .................. 364/419 |
| 2062916A | 5/1981 | United Kingdom . |

OTHER PUBLICATIONS

"Automatic Spelling Correction in Scientific and Scholarly Text," Joseph J. Pollock and Antonio Zamora, *Communications of the ACM*, Apr. 1984, vol. 27, No. 4, pp. 358-368.

"SPEEDCOP—Final Report," J. J. Pollock, Nov. 1981.

(List continued on next page.)

*Primary Examiner*—Archie E. Williams
*Attorney, Agent, or Firm*—Lahive & Cockfield

[57] ABSTRACT

An electronic database search system can identify database records having textual expressions that match, or are similar to, an operator-designated search expression. The system features a mechanism for transforming linguistic expressions, e.g., words, into linguistically salient word skeletons. Skeletal modification and suffix stripping features are employed to enhance expression-matching qualities of the word skeletons and to reduce data storage requirements.

13 Claims, 5 Drawing Figures

OTHER PUBLICATIONS

"System Design for Detection and Correction of Spelling Errors in Scientific and Scholarly Text," J. J. Pollock and A. Zamora, *Journal of the American Society for Information Science,* Mar. 1984, pp. 104–109.

"SPEEDCOP—Task A.1: Quantification," J. J. Pollock, Jul. 1980.

"SPEEDCOP—Task A.3: Word Classification," K. A. Hamill, Jun. 1980.

"SPEEDCOP—Task A.3/Task A.5: Trigram Overlap Between Automatically Derived Word Classes," Yelena M. Nayvelt, Nov. 1980.

"SPEEDCOP—Task A.4: Word Structure Analysis," K. A. Hamill and J. J. Pollock, Jan. 1981.

"SPEEDCOP—Task A.5: The Use of Trigrams for Spelling Error Detection," Y. M. Nayvelt, Oct. 1980.

"SPEEDCOP—Task B.1: Automatic Correction of Common Misspellings," J. J. Pollock, Oct. 1981.

"SPEEDCOP—Task C: Evaluation of Spelling Error Detection/Correction System," J. J. Pollock, Sept. 1981.

"Automatic Spelling Error Detection and Correction in Textual Databases," J. J. Pollock and A. Zamora, *International Interaction; Proceedings of the ASIS Annual Meeting,* vol. 19, Oct. 1982, pp. 236–238.

"Spelling Error Detection and Correction by Computer: Some Notes and a Bibliography," J. J. Pollock, *Journal of Documentation,* vol. 3, No. 48, Dec. 1982, pp. 282–291.

"Collection and Characterization of Spelling Errors in Scientific and Scholarly Text," J. J. Pollock and A. Zamora, *Journal of the American Society for Information Science,* Jan. 1983, pp. 51–58.

"The String-to-String Correction Problem," R. A. Wagner and M. J. Fischer, *Journal of the Association for Computing Machinery,* vol. 21, No. 1, Jan. 1974, pp. 168–173.

"The Use of Trigram Analysis for Spelling Error Detection," E. M. Zamora, J. J. Pollock and A. Zamora, *Information Processing & Management,* vol. 17, No. 6, 1981, pp. 305–316.

"Abbreviated Typing for Word Processing," S. J. P. Todd, *IBM Technical Disclosure Bulletin,* vol. 21, No. 9, Feb. 1979, pp. 3796–3797.

H. A. Gleason, Jr., An Introduction of Descriptive Linguistics, Revised Edition, Holt, Rinehart and Winston, New York, 1961, pp. 24, 34–35, and 58–61.

"Exact and Approximate Membership Testers," Carter et al, *Proceedings of the 10th Annual ACM Symposium,* May 1978, pp. 59–65.

"Give Your Computer an Ear for Names," J. Munnecke, *Byte Magazine,* vol. 5, No. 5, May 1980, pp. 196–200.

"Reducing Dictionary Size by Using a Hashing Technique," D. J. Dodds, *Communications of the Association for Computing Machinery,* vol. 25, No. 6, 1982, pp. 368–370.

TEXTUAL DATABASE SYSTEM USING SKELETONIZATION AND PHONETIC REPLACEMENT TO RETRIEVE WORDS MATCHING OR SIMILAR TO QUERY WORDS

This is a continuation in part of U.S. Pat. No. 4,580,241 (U.S. Ser. No. 467,834 filed Feb. 18, 1983), for "Graphic Word Spelling Correction Using Automated Dictionary Comparisons with Phonetic Word Skeletons". This is also a continuation in part of U.S. patent application Ser. No. 699,202, filed Feb. 5, 1985, for "Method and Apparatus for Semi-Automatic Spelling Correction", and U.S. patent application Ser. No. 750,911, filed July 1, 1985, for "Method and Apparatus for the Electronic Storage and Retrieval of Expressions and Linguistic Informaiton".

BACKGROUND OF THE INVENTION

This invention is directed to a method and apparatus for retrieving information from a computer database. More particularly, the invention provides a system for identifying within a computer database records which contain text matching, or similar to, an operator-designated input expression. The invention is applicable, for example, as word look-up device in an electronic dictionary.

Since the emergence of relatively low-cost mass data storage devices, industry has relied on computers to store information for ready access and updating. Early systems for retrieving the stored information were relatively crude. Typically, an operator seeking a specific data record had to scan a lengthy data printout to obtain the record's key. The operator was then required to enter this key to cause the data record to be printed or displayed on the console.

Today, non-computer users are often called upon to perform their own computer searches to retrieve information stored in computer databases. Libraries, for example, store cataloging records on-line to facilitate access to library collections. Trademark search firms utilize computerized trademark databases to speed the identification of registered trademarks and pending trademark applications. Publishing companies provide computer-readable dictionaries for use with word processors to enhance the capabilities of automated office work stations.

This increased computer use has created a need for improved database search apparatus. Rather than relying upon obscure record keys, these systems must perform searches based on operator-designated words or expressions. At a minimum, a search apparatus must permit the identification of database records which contain text exactly matching an input expression. A more sophisticated apparatus must match not only exact expressions but also "wild card" expressions, i.e., those which include special characters, e.g., "#" or "*", which match any intermediate or subsequent characters. For example, the look-up expression "characteriz*" might be used to attempt to match database records having any of the strings "characterize", "characterizes", "characterizing", or "characterized".

The art currently provides a variety of wild-card database searching systems. While clearly an improvement over prior facilities, the wild-card systems suffer drawbacks. For one, the systems often match an over-inclusive set of database records. In the preceding example, if the operator wished to find all records containing forms of the verb "to characterize", he or she would enter the wild card expression "characteriz*". However, in addition to matching the verbal forms "characterize", "characterizes", "characterizing", and "characterized", the wild card expression might also match records having the nominal forms "characterizer", "characterizers", "characterizer's", "characterizers'", "characterization", "characterizations", "characterization's", and "characterizations'".

Moreover, the currently available systems do not recognize misspellings. If, for example, the operator misspells the literal portion of the search string, e.g., instead of "characteriz*" the operator enters "caracteriz*", the search apparatus will not find any matching records. This seriously impedes the utility of such a system for application as an electronic dictionary. Likewise, these systems are difficult to use in trademark search applications. There, the operator is required to enter all possible phonetic spellings of the mark of interest in order to find all trademarks and tradenames which sound the same.

An object of the invention, accordingly, is to provide an improved database search facility. More particularly, an object of the invention is to provide a search facility responsive to a textual input expression for locating database records having text which matches, or is similar to, the input expression.

Another object of the invention is to provide a database search facility which can match records in spite of operator spelling errors.

Still another objection of the invention is to provide a database search facility which locates database records having inflectional forms which differ from that of the designated input expression.

Yet another object of the invention is to provide a database search apparatus which is user-friendly and which operates with sufficiently high speed for convenient on-line use and operator interaction.

Further, an object of the invention is to provide a database search apparatus which matches one-part expressions, e.g., the word "characterize", as well as multiple-part expressions, e.g., the phrase "carte blanche".

Other objects of the invention are evident throughout the description which follows.

GENERAL DESCRIPTION

The invention provides a system for searching a database for records having text expressions that match, or are similar to, an operator-designated input expression. The system features, in part, the transformation of text expressions to linguistically salient word skeletons. The system also features the use of skeletal modification techniques for enhancing error-anticipating qualities of the word skeletons. Further, the system utilizes suffix stripping rules for improved expression matching and reduced data storage requirements.

In one aspect, the invention relies on the conversion of text expressions, e.g., words, to skeletal form prior to their comparison. This skeletal form, termed a linguistically salient word skeleton, is an entity which combines the salient graphic components of a written word with salient phonetic components of its spoken form. Unlike a word's conventional graphic form, a linguistically salient word skeleton is unaffected by cognitive spelling errors, i.e., those which result from the operator's not knowing how to spell the word.

Cognitive errors commonly arise because of a lack of correspondence, or isomorphy, between the graphic form of a word and the phonetic, or spoken form of that word. As one example, the following four words all have the phonetic long "e" sound in the second syllable, but use four different spellings to represent that sound: "proceed", "precede", "receive" and "believe".

In English, discrepancies between the graphic and the phonetic forms of words arise in part from the spelling of unstressed vowels, of stressed long vowels and of some short stressed vowels, of single and of double consonants, and of silent vowels and consonants. Other discrepancies stem from different historical origins for words. This factor, for example, gives rise to different pronunciations of the same letters, such as the difference pronunciations of the letters "ch" in the words "chronic", "cheat", and "chauffeur"

According to the invention a linguistically salient word skeleton anticipates the foregoing discrepancies. One skeleton-forming process reduces, simplifies, or even eliminates the word parts which embody a discrepancy. For example, the four words "proceed", "precede", "receive", and "believe" noted above are transformed into skeletons by eliminating the troublesome letters "ee", the penultimate "e", and the terminal "e", "ei", and "ie". A word skeleton incorporates more salient parts of each word to identify its unique, distinguishing pattern of alphabetic characters, i.e., letters.

A linguistically salient word skeleton formed in accord with the invention also provides more linguistic distinctions in the skeleton of a short word than in the skeleton of a long word. The embodiment described below provides a four-way linguistic distinction for vowel sounds in short words: front and back, vocalic distinction for long words. More than two distinctions are deemed undesirable for long words because the added distinctions may interfere with the correction of certain misspellings. The two distinctions selected have been found sufficient, with other structures of long words, to characterize the word skeleton sufficiently and ensure that the correction system does not produce a large number of correctly spelled, but inappropriate suggestions. In short words, on the other hand, the stated four distinctions provide a finer initial differentiation which enables the system to produce a small number of correctly spelled suggestions for correcting the misspelling.

In another aspect, the invention extends the utility of the skeleton-forming process by application of skeletal "targeted" substitution rules. These substitutions operate on skeletons produced from an operator-designated input search expression to produce a modified skeleton. These resultant skeletons are compared with the database skeletons to provide a larger set of matching or similar expressions In yet another aspect, the invention calls for the application of suffix analysis and stripping rules to alter the form of the search expression. Specifically, these rules are applied to a search expression to produce a root, or base form, thereof. By way of example, if the operator enters the search word "running", the system can test for and remove the ending "ing", as well as the doubled final consonant "n", in order to find all database records having forms of the verb "run".

The suffix stripping feature also anticipates suffix misspellings. For example, if the operator enters the misspelled form "runing", the system will nevertheless return records relating to the verb "run". Moreover, because the system can compare base forms, database storage requirements are reduced.

With regard to this latter point, further background is in order. Generally, English verbs occur in five inflectional forms, while English nouns occur in four inflectional forms. The verbal forms are the infinitive, the present tense-third person singular, the past tense, the past participle, and the present participle. For example, for the verb "consider", these forms are "consider, considers, considered, considered, considering", while for the verb "transfer", the forms are "transfer, transfers, transferred, transferred, transferring". Together, the inflectional forms of a verb comprise a verbal paradigm.

The inflectional forms of English language nouns are the singular, the singular-possessive, the plural, and the plural-possessive. The nominal paradigm for "dog" is "dog, dog's, dogs, dogs'". Similarly, the paradigm for the noun "try" (meaning, an attempt) is "try, try's, tries, tries'".

A majority of English nominal and verbal paradigms include exclusively elements which are formed by the addition of a suffix to a base form. Sometimes prior to the appending of the suffix, the terminal letter of the verb is altered, e.g., doubled, dropped, or replaced. See, for example, the inflectional forms of the verbs "to consider" and "to transfer" and the nouns "dog" and "try", listed above. Paradigms of these word types are deemed "regular".

A second class of paradigms, include, in addition to elements formed by appending a suffix to a base form, one or two exceptional inflected forms which are not amenable to broad categorization. The verb "to give", for example, has three regular paradigm elements, i.e., the uninflected base form "give", the present tense, third person singular form "gives", and the present participle form "giving". The paradigm also includes two exceptional elements, i.e., the past tense form "gave", and the past participle form "given". Another word having a partially irregular paradigm is, the noun "ox", which has an exceptional irregular form "oxen". Paradigms of this type are deemed "partially irregular".

A third class of paradigms is associated with those relatively few words which have inflectional forms which do not fall within the above classifications. These words are characterized as (1). having verbal paradigms for which an exceptional inflected element is neither a past participle form or a past tense form; or (2) having a partially irregular paradigm for which an inflected element is either (a) equivalent to the base form of another irregular paradigm (e.g., "saw" is the past tense of the irregular verb "to see", and is also a base form verb (meaning "to cut") having the irregular past participle "sawn"), or (b) equivalent to an inflected form of any other paradigm (e.g., "lives" is the irregular plural of the noun "life", and the regular third person singular form of the verb "to live") Exemplary fully irregular paradigms in this class are associated with the verb "to be" ("be", "am", "is", "are", "was", "were", "been", "being"); and, with the noun-verb "saw" ("saw", "saw's", "saws", "saws'", "sawed", "sawn", "sawing").

Since all elements of a regular paradigm, as well as a majority of elements of a partially irregular paradigm, are readily derived from a base form expression, a system employing suffix stripping need merely store the appropriate base form expressions. In addition, the system can store the exceptional irregular forms of partially and fully irregular paradigms.

The invention therefore contemplates, in one aspect, a database search apparatus combining the above-described skeleton-forming and suffix-stripping features. The apparatus includes an input element for accepting a search linguistic expression, i.e., the expression designated by the operator for look-up in the database. The apparatus also includes a storage element for storing a database which includes textual linguistic expressions, as well as information pertaining to those expressions. A database matching element, which includes a skeleton-forming element, identifies within the database a linguistic expression matching, or similar to, the search expression. An output element generates a signal indicative of the success of locating a matching or similar expression and a signal representative of the matching expression and information.

In another aspect, the invention contemplates a database search apparatus which includes a skeletal target modification element. This element selectively modifies a search word skeleton by replacing one or more of its skeletal symbols with a different skeletal symbol. The element compares this modified search skeleton with the skeletons of the database expression and repeats the modification, for example, if no matching expressions are found.

In further accord with the invention, a database storage element of the search apparatus can include a main dictionary for storing plural addressable entries, each representative of a linguistic expression. The stored expressions can be base forms of regular or partially irregular paradigms, exceptional inflected forms of partially irregular paradigms, or elements of fully irregular paradigms. For sake of convenience, these latter two expression types are referred to as irregularly inflected forms. A pointer structure element can link irregularly inflected forms, as well as multiple-part expressions, to main dictionary base form expressions.

A database search apparatus according to the invention can further include an element for stripping a suffix from an input expression to identify a base form thereof. Similarly, the apparatus can include an element for stripping a suffix-like skeletal symbol from a search expression skeleton.

A comparison element can be employed to determine quantitative differences between the input search expression and matching or similar database expressions. The element generates a signal representing a mathematically determined "disparity" value. By comparing the respective disparity value signals associated with each database expressions, the system can order the expressions for presentation to the operator.

In other aspects, the invention contemplates methods for database searching paralleling the operation of the apparatus discussed above. A more complete understanding of the invention may be attained by reference to the following description and llustrations and by reference to the aforementioned related patent applications U.S. Pat. No. 4,580,241 (U.S. patent application Ser. No. 467,834, filed Feb. 18, 1983), U.S. patent application Ser. No. 699,202, filed Feb. 5, 1985, and U.S. patent application Ser. No. 750,911, filed July 1, 1985. These references are incorporated herein by reference.

BRIEF DESCRIPTION OF THE ILLUSTRATIONS

DETAILED DESCRIPTION OF THE ILLUSTRATED EMBODIMENT

Figure 1:
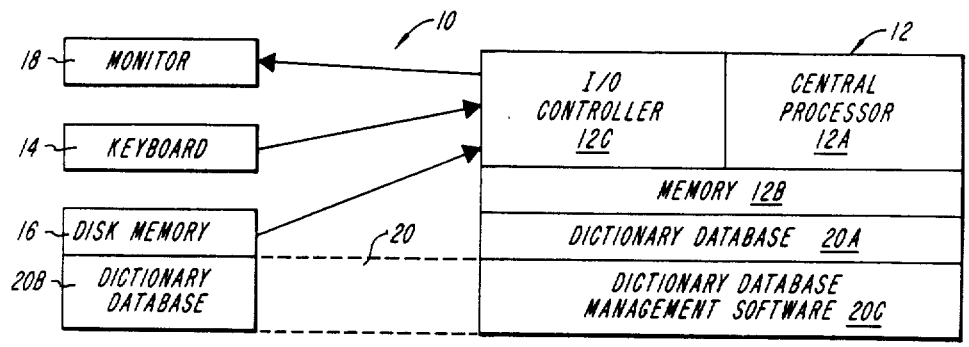
FIG. 1 depicts a computer system for use in practice of the invention.

A computer system for practice of the invention typically is configured as shown in FIG. 1. The illustrated system 10 has a programmed digital computer 12 which includes a central processing unit 12A connected with a memory unit 12B and with an input/output control unit 12C. The computer 12 can be any of numerous commercially available programmable digital computers.

The computer 12 is connected with a high speed non-volatile storage device, such as disk memory 16. Computer 12 also connects with a display terminal 18 and with a keyboard 14. The terminal and the keyboard provide an interface between the system user and the computer. Specifically, the keyboard translates user-typed commands into computer-readable signals, while the display terminal 18 displays, in human-readable form, signals output from the computer.

The illustrated system 10 employs portions of various memory elements to store a dictionary database 20, indicated with dashed lines. In particular, the computer memory unit 12B stores a database portion 20A while the disk memory 16 stores database portion 20B. Further, the computer memory unit 12B retains database management software 20C.

The database management software 20C controls the accessing and decoding of information stored in database portions 20A and 20B and thereby permits the retrieval of database entries in logical form, i.e., in the form of linguistic expressions. The software thus eliminates the requirement that the physical layout and form of the data be defined within the search apparatus modules.

Figure 2:
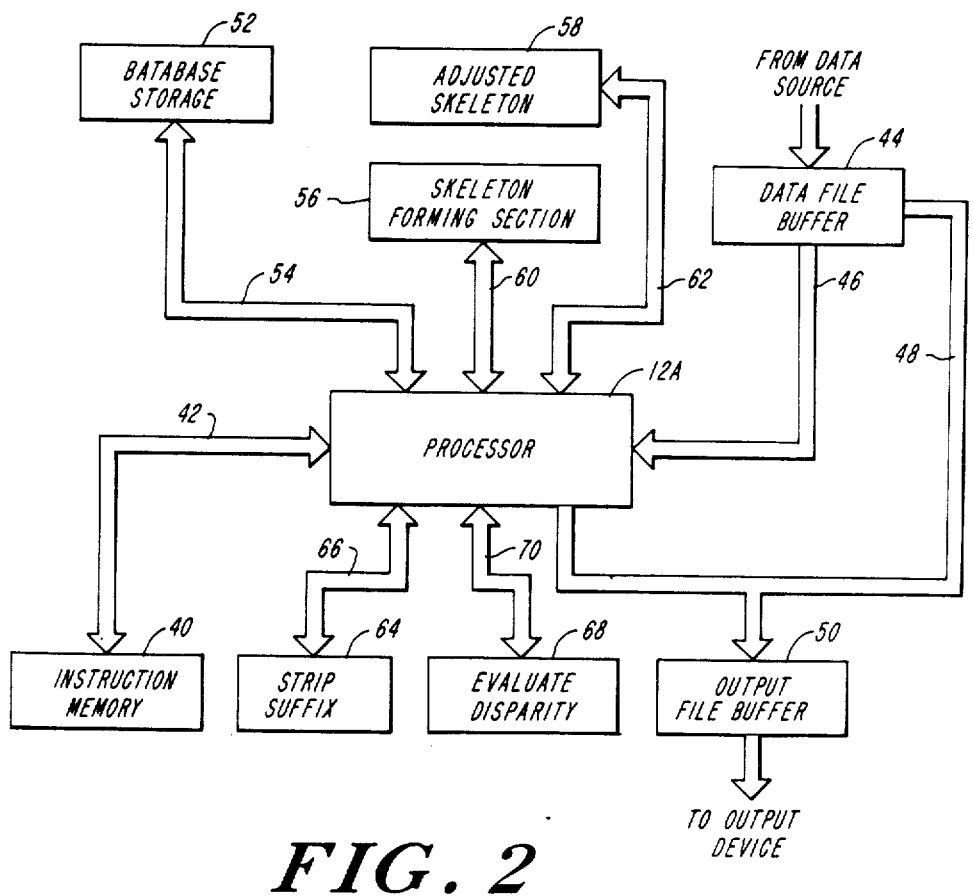
FIG. 2 depicts various elements of the computer system shown in FIG. 1.

FIG. 2 depicts the operative arrangement of the various subcomponents of computer system 10 (FIG. 1) and, particularly, the processor and memory sections. The computer memory (element 12B of FIG. 1) includes an instruction memory 40 which stores instructions controlling the system operation. This memory 40 is in two-way communciation over bus line 42 with the processor 12A. A data file buffer 44 also forms part of the memory element and stores, for example, a search linguistic expression received from the operator, e.g., via the keyboard (element 14 of FIG. 1). In the illustrated arrangement the data file buffer 44 transmits data to the processor 12A on bus line 46, while receiving data from the processor 12A by way of bus line 48. An output file buffer 50 also forms part of the memory unit and stores output text, e.g., a list of database expressions identified as being similar to the input search expression. The processor 12A transmits data to the output file buffer 50 by way of bus line 48.

The computer memory 12B also includes a database storage section 52. This section stores the database entries which are to be matched with the operator-designated expression. The section includes linguistic expressions and information pertaining thereto. For example, the storage section 52 can store signals representative of dictionary words and their definitions, or trademarks and their use information. The database storage section 52 is in two-way communication with the processor 12A by way of bus 54.

FIG. 2 also shows functional components of the processing system. Element 56, for example, depicts a section of the processing system which forms linguistically salient word skeletons. This element 56 communicates with the rest of the system by way of bus 60.

The processing section also includes the adjusted skeleton forming section 58. This section typically accepts, as input, the skeleton of an input search expression, applies target modification rules to that skeleton, and generates a variant skeleton. Communication between the adjusted skeleton forming section 58 and the processor 12A is carried out over data line 62.

In addition to the skeleton forming sections 56 and 58, the processing section includes a suffix stripping section 64. This section, which communicates with the processor 12A via bus line 66, identifies a base form of the input search expression. Alternatively, section 64 identifies the search expression as an irregularly inflected form.

A disparity value evaluation section 68, also part of the processing system, compares an input search expression, or a variant thereof, with a database expression. By comparing the disparity value resulting from this comparison with the values associated with other database expressions, the system can determine how to arrange the expressions for output. Communication between the disparity value evaluation section 68 and the processor is carried out over bus line 70.

Figure 3:
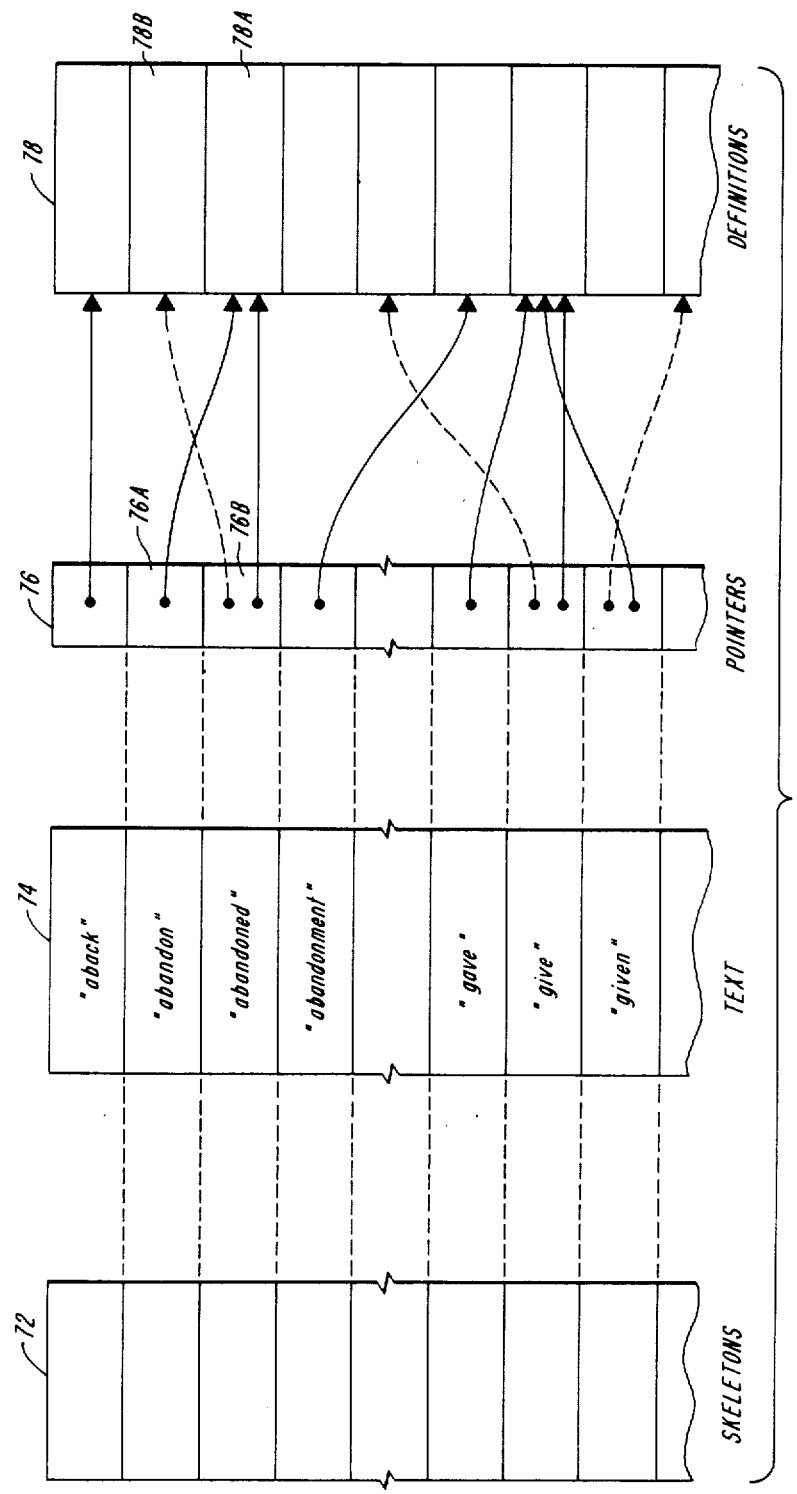
FIG. 3 depicts a database constructed in accord with one practice on the invention.

FIG. 3 illustrates the structure of an exemplary database for use in one practice of the invention. The illustrated database includes four sections: a skeleton array 72, a text expression array 74, a pointer array 76, and a definition array 78. The text array 74 contains textual expressions to be matched with the input expression upon receiving a database search request. This array represents an index field of the database, e.g., a list of dictionary words or trademarks. In the illustrated embodiment, the array 74 is of the type employed in a search apparatus configured as an electronic dictionary. Moreover, each text array entry stores a signal representative of a single database text expression.

The definition array 78 stores information pertaining to the expressions in the text array 74. In the illustrated embodiment, the stored information can represent word meaning, etymology, usage examples, grammatical tags, and so forth. As indicated in the illustration, each entry of array 78 can represent an individual word definition.

The contents of the pointer array 76 define the relationship between the entries of the text array 74 and those of the definition array 76. Addressing information stored within each pointer array entry is directed to the definition array entry or entries relating to the corresponding text entry. For example, as shown in the illustration, pointer array entry 76A corresponds to the text array entry for the word "abandon". This pointer array entry 76A stores a pointer directed to the definition of that word in definition array 78A. Similarly, pointer array entry 76B stores two pointers directed to definitions for the text array entry "abandoned". In the illustrated embodiment, the pointer array 76 parallels the text array 74. That is, each entry of the pointer array 76 corresponds to an entry of the text array 74.

The skeleton array 72 stores linguistically salient word skeletons corresponding to each entry of the text array 74. These skeletons facilitate rapid access and comparison of the text expressions in text entries.

In one embodiment, the expressions stored in the arrays 72, 74, and 78 are stored in conventional form, e.g., 7-bit ASCII. In an alternate embodiment, these expressions are compacted to save memory space. According to one preferred data compaction technique, the letters of each expression are converted to a 5-bit form. In one such conversion, the characters (blank), "a", "b", "c", . . . , "z", "'", "—", ".", and "/" are transformed to binary codes having the decimal values 0, 1, 2, . . . , and 30, respectively.

As shown in the illustrated embodiment, the database can retain a single skeletal array storing word skeletons corresponding to the entries of a single text array 74. Alternatively, multiple skeletal arrays can be employed to retain word skeletons of each of several text expressions of interest in the database. These skeletal arrays then serve as multiple indexes. In such an embodiment, the contents of the text array 74 can be combined with that of the definition array 78. Further, the pointer array 76 would provide association between the skeletal array and the text/definition array.

In yet another embodiment, the database need not include a skeleton array. Rather, skeletons for each word in the text array 74 can be computed at run time. In such an embodiment, the entries of the text array 74 can be arranged in an alphabetical order of the corresponding skeletons.

In an embodiment configured to operate as an electronic dictionary, the array 74 can include entries representing "head" words, irregularly inflected forms, "run-ons", phrasal verbs, and idiomatic expressions. Head words represent dictionary main entries and include such words as "intelligent", "intelligible", "intemperate", "legal tender", and so on. Run-ons typically represent adverbs, adjectives, or other forms of head words, e.g., the words "intelligential", "intelligently", "intelligibility", "intelligibleness", "intelligibly", "intemperately", and "intemperateness". Irregularly inflected forms, as defined above, represent inflectional elements of partial and fully irregular paradigms, e.g., the words "knew", "known", "be", "am", "is", "are", "was", "were", "been", and "being". A phrasal verb is a two-part verb comprising a base verb and a particle, e.g., "look up", "track down", and "throw in". Idiomatic expressions represent multi-word forms of head words, e.g., the expressions "a la carte", "change hands", "change (one's) mind", and "change off".

A text expression array 74 including head words, irregularly inflected forms, run-ons, and idiomatic expressions can be represented by a linked data structure, rather than by a simple linear array. In such a linked data structure, those entries of the text expression array 74 which represent a non-head word, i.e., irregularly inflected forms, run-ons, or idiomatic expressions, can include a pointer directed to a related head word entry. For example, entries representing the idiomatic expressions "change hands", "change (one's) mind", and "change off" can include pointers directed to an entry for the head word "change".

Figure 4:
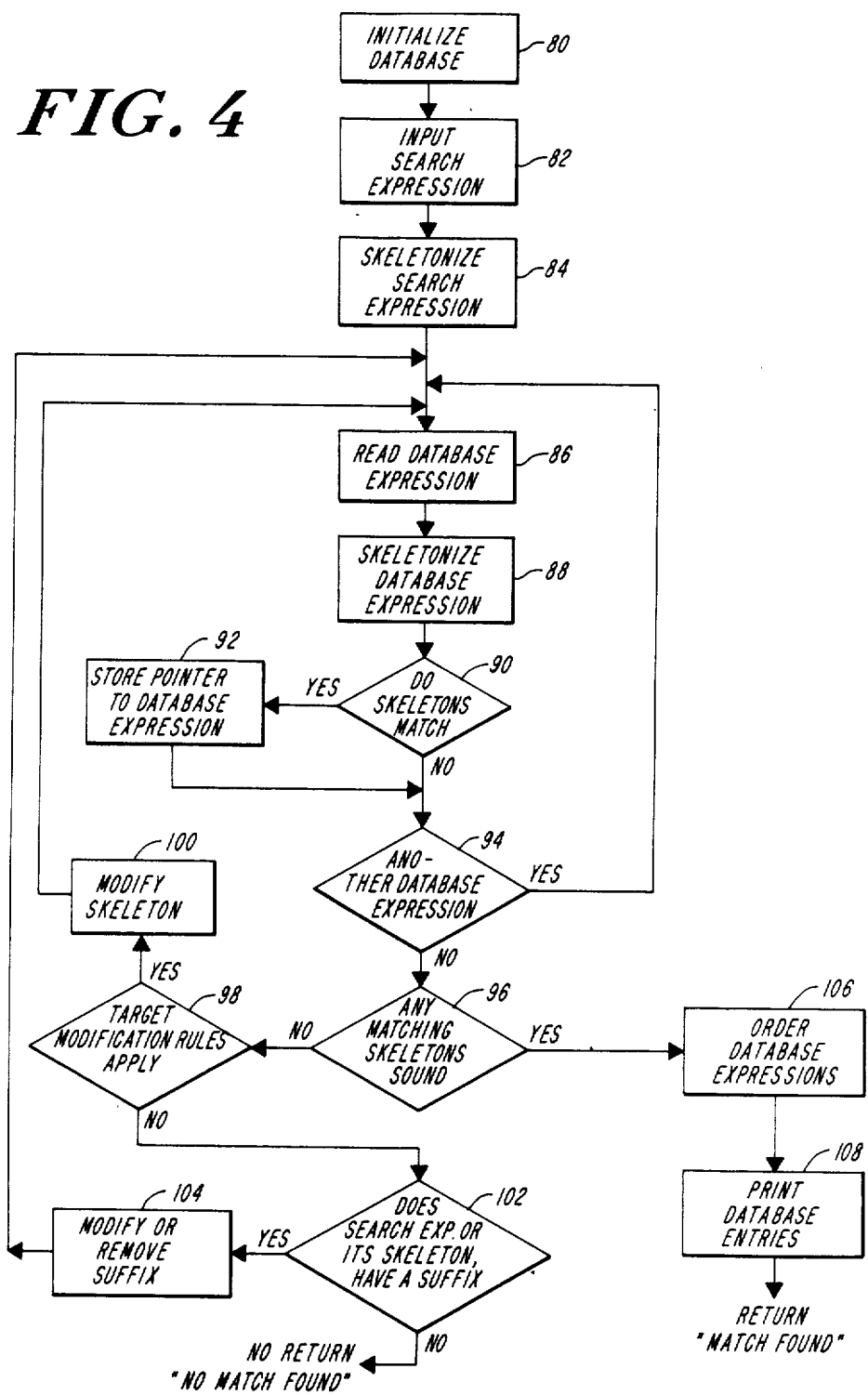
FIG. 4 is a flow chart depicting the operating sequence for a database search apparatus constructed in accord with one practice of the invention.

FIG. 4 is a flow chart depicting an operational sequence for a database search apparatus operating in accord with one practice of the invention. In step 80, the process initializes program variables and database storage sections. This initialization is governed, in part, by database management software 20C (FIG. 1) and, in part, by the applications software. In step 82, the sequence accepts a search expression, typically furnished by the user via the keyboard.

In step 84, the illustrated process forms a linguistically salient word skeleton of the input expression. In forming this skeleton, a preferred process operating according to the invention carries out groups of conjunctively ordered steps. The output from one such step is the input to a subsequent step in the skeletonizing process. Other steps, however, are complementary, i.e., disjunctive, and may be applied in different sequential orderings. The formation of a word skeleton is further characterized by the use of context-sensitive rules. These rules process parts of a word selectively, depending on such word-context factors as position in the word, letters, and the following or preceeding letters.

The skeleton-forming process may be characterized, in part, as a set of ordered transformation rules on the word character string, including the steps of (i) omitting from the word skeleton a selected alpha set, i.e., character sequence, of the expression being converted which lacks isomorphy with a phonetic representation of that selected set, and (ii) replacing with a different linguistic symbol another selected alphabetic set, if any, of the expression being converted which lacks isomorphy with a phonetic representation of that other selected set.

A preferred set of computer program rules or instructions for forming the word skeleton of a database expression and the skeleton of search expression, are set forth below.

The instruction set uses the following definitions:
position: each letter in the word occupies a numbered position, starting with one for the left most position, i.e., the first letter of the word.
word-initial: the letter occupying position one is the word-initial.
word boundary: the end of the word is marked by the symbol "#", which immediately follows the last letter in the word.
word-final: word-final position is defined as the position immediately preceeding #.

Lower case letters in this program are alpha characters of the English language, "E", "I", "O", "W", and "Y" are linguistic vocalic symbols; and " " is a trace and represents a generic non-phonetic vocalic symbol. The instructions are listed in a preferred execution sequence.

Every "c" followed immediately by "e", "i", or "y" is rewritten as "s".
Every non-word-initial "z" is rewritten as "s".
Every "qu" sequence is rewritten as "kw".
Word-initial "wr" sequences are rewritten as "r".
Word-initial "wh" sequences are rewritten as "h" when followed immediately by "o".
All sequences of "wh" are rewritten as "w" when followed immediately by "e", "i", "a", or "y".
Every "tch" sequence is rewritten as "kh"
Sequences of "tu" are rewritten as "kh" when followed by a single occurrence of "r", "n", "m", or "l" which is followed by "e", "a", "i", "o", or "y". Position restrictions: This operation does not apply to sequences beginning in position one or position two of the word.
Sequences of "tu" are rewritten as "kh" when followed by "o", "a", or "e". The letter "o", "a", or "e" in this sequence is then rewritten as "o". Position restrictions: This operation does not apply to sequences beginning in position one or position two.
Word-final "y" is rewritten as "Y". Position restrictions: This operation does not apply to words of less than three letters.
Word-final "ie" sequences are rewritten as "Y". Position restrictions: This operation does not apply to words of less than four letters. Word-final "i" is rewritten as "Y". Position restrictions: This operation does not apply to words of less than three letters.
Every intervocalic "i" or "y" is rewritten as "Y". In other words, every "i" or "y" that is both preceded and followed by any member of the set "e, i, o, a, u" is rewritten as "Y".
Every "y" that is immediately preceded by a consonant (a member of the set "t, n, r, s, h, d, l, c, f, m, p, g, b, v, w, x, q, j, z") is rewritten as "i".
Sequences of "si" and "ti" are rewritten as "sh" when followed immediately by "a", "o", or "u". Position restrictions: This operation does not apply to sequences beginniung in position one or position two.
Word-final sequences of "gue" are rewritten as "ge". Position restrictions: This rule does not apply to sequences begining in position one or position two.
Every remaining "ue" sequence is rewritten as "oo".
Sequences of "e", "a", or "o" followed by "u" or "w" are rewritten as "oo" when followed by a consonant (member of the set "t, n, r, s, h, d, l, c, f, m, p, g, b, v, k, x, q, j") or when word-final.
Word-final sequences "ea" and "ia" are rewritten as a trace (" "). Position restrictions: This operation does not apply to words of less than four letters.
Word-final "a" is rewritten as a trace (" ") in words of four or more letters.
Word-final "ae" sequences are rewritten as a trace ("_") in words of five or more letters.
All word-initial vowels or (word-initial) sequences of vowels (members of the set "a, e, i, o, u") are rewritten as a trace ("_").
Every "dg" sequence is rewritten as "g".
Every remaining "c" is rewritten as "k".
Every sequence of two or three identical consonants (members of the set "t, n, r, s, h, d, l, f, m, p, g, b, v, w, y, k, x, q, j") is rewritten as a single consonant.
Every "ks" sequence is rewritten as "x".
Sequences of "xion" are rewritten as "xhon". Position restriction: This operation does not apply to word-initial sequences.
Word-initial "ps" sequences are rewritten as "s".
Every "rh" sequence is rewritten as "r".
Non-word-initial sequences of "ght" are rewritten as "te".
Every "ph" sequence is rewritten as "f".
Every "gn" sequence is rewritten as "n".
Word-initial sequences of "kn" or "pn" are rewritten as "n".
Every "sx" sequence is rewritten as "x".
The letters "e", "i", and "a" are rewritten as "E" when preceded exclusively by consonants and/or preceded by the trace of word-initial vowels.
The letters "o" and "u" are rewritten as "O" when preceded exclusively by consonants and/or preceded by the trace of word-initial vowels.
The symbol "E is rewritten as " when it is followed by a single "r" which is followed by any other consonant (member of the set "t, n, s, d, l, f, m, p, g, b, v, k, q, j, z") or a word boundary. Position restriction: This operation does not apply to letters in word-initial position.

Word-final "o" and "u" are rewritten as "O". Position restriction: This operation applies only to words of two or more letters.

Word-final "oe" sequences are rewritten as "O". Position restriction: This operation applies only to words of two or more letters.

The symbol "E" is rewritten as "I" when it is followed exclusively by consonants (up to nine without any intervening vowels).

The symbol "O" is rewritten as "W" when it is followed exclusively by consonants (up to nine without any intervening vowels).

Every remaining "a", "e", "i", "o", "u", and "y" is deleted. Position restriction: This operation does not apply in word-initial position.

Every hard hyphen and period is deleted.

Referring to FIG. 4, after forming a skeleton from the input search expression, the illustrated process reads a database expression and creates its word skeleton; see steps 86–88. As discussed above in conjunction with FIG. 3, each database expression skeleton can be stored along with the expression itself, thus eliminating the need to create the skeleton at run-time. Conversion of the database expression to a skeleton is carried on in the manner discussed above.

In step 90, the process compares the skeleton of the input search expression with that of the database expression. If the skeletons match, the process stores a pointer to the matching database expression or, alternatively, stores the expression and any information pertaining to it, e.g., definitions, for later access; see step 92.

According to one practice of the invention, the process compares the search expression skeleton with the skeleton of each database expression; see step 94. According to another practice, the database expressions and their linguistically salient would skeletons, if available, are read in an order determined by the alphabetical sequence of the skeletons themselves. Upon determining that a database expression skeleton is alphabetically greater than the search expression skeleton, the process can terminate the comparison phase; see steps 86–94. In other embodiments, the search apparatus may be required to read the entire database in order to find all matching skeletons.

In step 96, the illustrated process determines whether any matching database expressions have been identified. If not, the process proceeds to steps 98, where it tests a search expression skeleton to determine whether any of the targeted substitution rules apply. Each rule calls for the substitution of one skeletal character sequence with another skeletal character sequence.

In the preferred embodiment, there are 73 targeted substitutions. These are identified in the table below.

| Skeletal Character Sequence | Sequence Substitution |
|---|---|
| 'E' | 'I' |
| 'O' | 'W' |
| 'I' | 'E' |
| 'W' | 'O' |
| 'rI' | 'Wr' |
| 'Wr' | 'rE' |
| 'E' | 'O' |
| 'O' | 'E' |
| 'W' | 'I' |
| 'I' | 'W' |
| 'rE' | 'Or' |
| 'I' | 'O' |
| 'Wr' | 'Er' |
| 'Or' | 'rO' |
| 'Or' | 'rE' |
| 'E' | 'Or' |
| 'fs' | 'vs' |
| 'k' | 'kh' |
| 'rtk' | 'rktk' |
| 'mt' | 'mpt' |
| 'g' | 'gh' |
| 'Or' | 'Ogh' |
| 'j' | 'g' |
| 'nb' | 'mb' |
| 'np' | 'mp' |
| 'nf' | 'mf' |
| 'sm' | 'sthm' |
| 'sh' | 'kh' |
| 'kht' | 'sht' |
| 'Ed' | 'Et' |
| 'Od' | 'Ot' |
| 'jl' | 'dl' |
| 'sh' | 's' |
| 'sh' | 't' |
| 'rE' | 'rE_' |
| 'k' | 'kw' |
| 'kY' | 'kw' |
| 'kY' | 'kwt' |
| 'Y' | 't' |
| 'j' | 'dj' |
| 'Wr' | 'Ogh' |
| 'gs' | 'x' |
| 'sl' | 'stl' |
| 'khn' | 'tn' |
| 'rmn' | 'rnmn' |
| 'W' | 'Wr' |
| 'E' | 'E_' |
| 'O' | 'Or' |
| 'rO' | 'Or' |
| 'Or' | 'O' |
| 'g' | 'j' |
| 'ns' | 'nsw' |
| 'm' | 'mn' |
| 'm' | 'mb' |
| 'Y' | '..' |
| 't' | 'tY' |
| 'sn' | 'stn' |
| 'sE' | 'skE' |
| 'km' | 'sm' |
| 'sh' | 'xh' |
| 'tn' | 'shn' |
| 'O' | 'Ogh' |
| 'E' | 'Egh' |
| 'I' | 'Il' |
| '._' | 'O' |
| '._' | 'r' |
| 'r' | '._' |
| 'O' | 'OO' |
| 'O' | '..' |
| 'p' | 'pt' |
| 'k' | 'kt' |
| 'nth' | 'ngth' |
| 'sE' | 'kO' |

After making a targeted substitution, if any, in step 100, the process is directed back to step 86. There, the process compares the modified search expression skeleton with the database expressions to find matching or similar expressions.

After unsuccessfully exhausting all targeted substitutions, the process proceeds to step 104. There, the search expression, or a word skeleton thereof, is analyzed to identify a suffix. If found, the suffix is stripped; see in step 104.

A preferred suffix analysis and removal method is provided in Appendix I. Briefly, this method calls for testing the final characters of the search expression. If suffix-like characters are identified, they are stripped.

The resultant expression is then compared with database linguistic expressions. If a similar expression is not found in the database, the search expression is re-examined for another suffix-like character sequence. Again, if found, the character sequence is stripped; the resultant expression being matched with the database expressions. In one preferred practice, this re-stripping practice proceeds through three sets of possible suffixes. If no similar database expressions are identified, the process returns to the calling routine; see set 102.

The routine shown in Appendix I includes the steps for checking the suffix type against the grammatical class, e.g., noun or verb, of the dictionary expression. Operation with this routine requires that the definition array include grammatical and inflectional information. Elimination of these steps will provide a working search apparatus, yet one incapable of recognizing grammatical differences, for example, as between forms of the verb "round", e.g., as used in "he rounded the corner", and forms of noun "round", e.g., as used in "a round of parties".

As an alternative to stripping suffixes from the input expression, the process can strip suffix-like skeletal symbols from the search expression skeleton. Thus, for example, skeletal symbols representing the suffixes "ing" and "es" can be stripped prior to comparison of the database expressions.

As discussed above, when used in conjunction with a suffix stripping routine, a dictionary search apparatus constructed in accord with the invention need not retain all inflected forms of the dictionary entries. Rather, for nominal and verbal entries only base forms of regular paradigms, exceptional inflected forms of partially irregular paradigms, and all elements of fully irregular paradigms are necessary. A list of exceptional and fully irregular paradigm elements is provided in Appendix II.

Referring again to FIG. 4, in the event the process has identified database expressions matching the search expression, or variant thereof, the process proceeds through the YES branch of step 96 to step 106.

At step 106, the process compares the search expression with the matching database expressions to make a quantitative determination of the relative degrees of similarity of the expressions. This determination is based upon an ordering of the disparity values associated with database expressions. Each disparity value is computed by a character-by-character comparison of each database expression with the search expression, as discussed in conjunction with FIG. 5, below. Generally, the smaller the disparity value, the more similar are the compared expressions.

After calculating the disparity values and ordering the database expressions, the process prints the ordered list of matching database expressions. Preferably, each expression is provided along with selected database information pertaining to the expression. For example, a printout in response to a search request for the expression "caracterizes", as provided by an electronic dictionary embodiment, would include all forms of the verb "to characterize", along with an appropriate definition.

Figure 5:
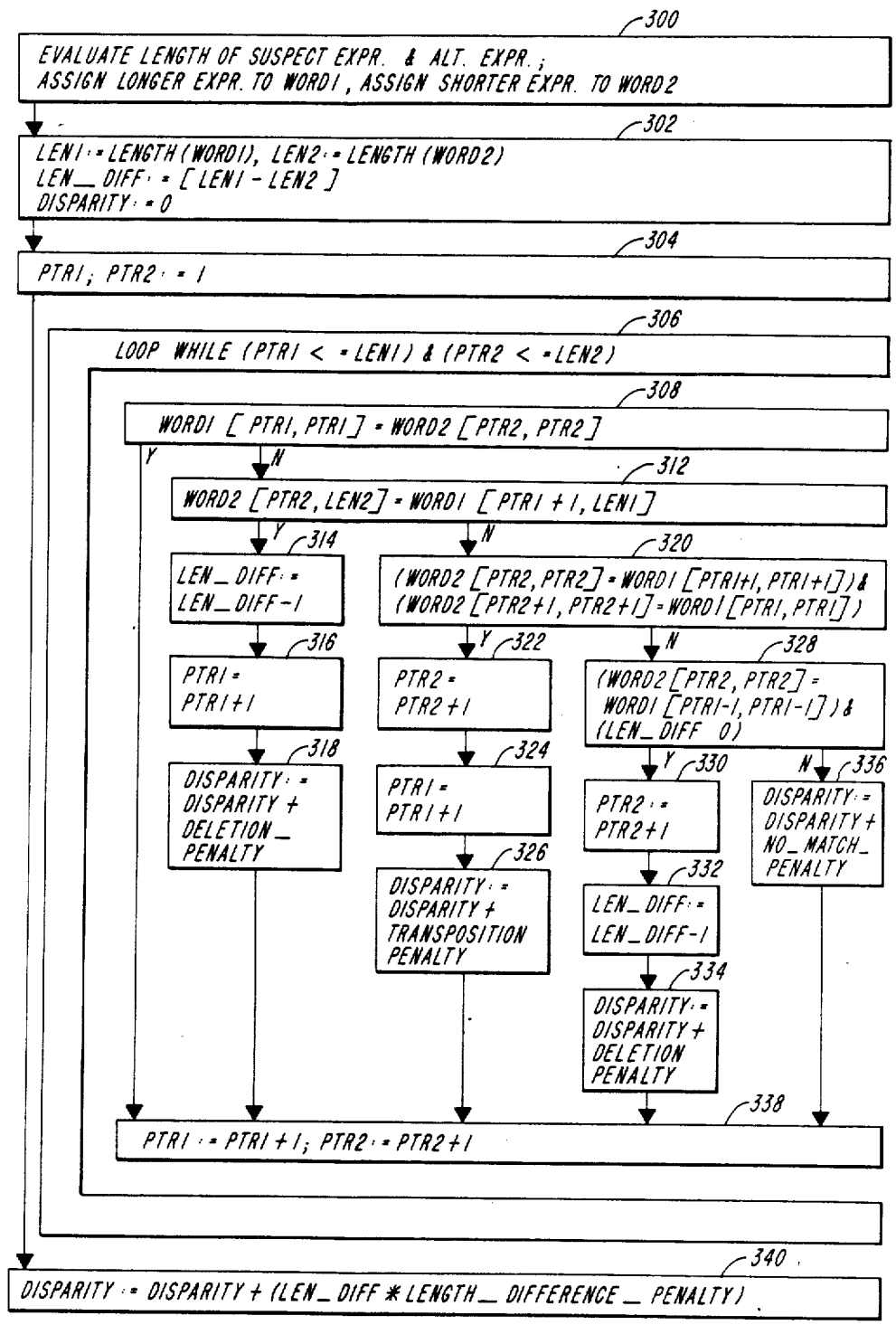
FIG. 5 depicts an operating sequence a disparity value calculating subsystem used in a system constructed in accord with one practice of the invention.

FIG. 5 presents in greater detail the process of the comparing a database expression with a search expression to calculate a disparity value. Through a character-by-character comparison, the process identifies character deletion disparity, unmatched character disparity, character transposition disparity, and expression character-length disparity. Character deletion disparity results where a character, contained in one expression, is absent from the other expression. Character transposition disparity results where a character pair in one expression is transposed with respect to a corresponding character pair in the other expression. Unmatched character disparity results where a character in one expression does not match an associated character in the other expression and where that mismatch is not the result of a character deletion or a character transposition. Further, expression character length disparity results where the compared expressions are of differing character lengths and where these differing lengths are not otherwise attributable to character deletion disparity or unmatched character disparity.

Upon identification of any of the above disparity types, the process increments a disparity accumulator by a penalty value associated with the detected type. In this way, the disparity accumulator stores a value numerically representative of the structural differences between the compared expressions.

Referring to FIG. 5, in step 300, the process evaluates the lengths of the search expression and of the database expression, hereinafter deemed an "alternate expression". The expression of greater length is assigned to the variable WORD1, while the expression of lesser length is assigned to the variable WORD2.

Step 302 illustrates the initialization of several program variables. Initially, the variable LEN1 is set equal to the character length of the expression stored in the variable WORD1. The variable LEN2 is set equal to the character length of the expression stored in the variable WORD2. The variable representing the difference between the character lengths of the two stored expressions, LEN-DIFF, is set equal to the absolute value of the difference between the variables LEN1 and LEN2. Further, the variable DISPARITY, referred to above as a disparity accumulator, is set equal to zero.

In step 304, the two current character pointer variables, PTR1 and PTR2, relating to the character currently subject to processing in each of the variables, WORD1 and WORD2, respectively, are set equal to one.

Step 306 delineates the boundaries of a program loop which evaluates the expressions stored in the variables WORD1 and WORD2 and determines, on a character by character basis, the differences between the expressions. The steps of the loop are executed sequentially, while the loop itself is executed repeatedly, until the loop termination conditions are met. These termination conditions are satisfied if the value of variable PTR1 is greater than the value of variable LEN1 or when the value of the variable PTR2 is greater than the value of variable LEN2.

Decision step 308 marks the beginning of the loop sequence. In that step, the current characters of the expressions stored in the variables WORD1 and WORD2 are compared. As indicated by the YES branch of step 308, if the current characters are equivalent, no specific action is taken and the process proceeds to step 338. If, on the other hand, the current characters of the stored expressions are not equivalent, the process proceeds through the NO branch of step 308 to step 312.

In decision step 312, the process compares the WORD2 sub-expression beginning at the current character with the WORD1 sub-expression beginning at the character following the current character. If these two sub-expressions are equivalent, the process proceeds through the YES branch of step 312 to step 314. Otherwise, the process proceeds through the NO branch of step 312 to step 320.

In step 314, the length difference variable LEN-DIFF is decremented by one. In step 316, the current character pointer for variable WORD1, variable PTR1, is incremented by one. In step 318, the variable DISPARITY is incremented by a penalty value corresponding with character deletion. Following step 318, the process preceeds to step 338.

In decision step 320, the illustrated system tests for a transposition error by performing two evaluations. The first evaluation involves comparing the current character of the expression stored in WORD2 with the character following the current character of the expression stored in variable WORD1. Conversely, the second evaluation involves comparing the character following the current character of the expression stored in variable WORD2 with the current character of the expression stored in variable WORD1. If both evaluations of step 320 are determined in the affirmative, the process proceeds through the YES branch of step 320 to step 322. Otherwise, the process proceeds to step 328.

In steps 322 and 324, the process increments by one the character pointers PTR1 and PTR2. In step 326, the process increments the variable DISPARITY by a character transposition penalty value. Subsequently, the process proceeds to step 338.

In decision step 328, the process performs two evaluations in testing for character deletion disparity. The first evaluation involves comparing the current character of the expression stored in WORD2 with the character preceding the current character of the expression stored in the variable WORD1. The second evaluation requires testing the length difference variable, LEN-DIFF, to determine if it is greater than zero. If both evaluations of step 328 are determined in the affirmative, the process proceeds through the YES branch of that step to step 330. Otherwise, the process proceeds to step 336.

In step 330, the pointer PTR2 is incremented by one. In subsequent step 332, the length difference variable, LEN-DIFF, is decremented by one. Subsequently, in step 334, the value of the variable DISPARITY is incremented by the deletion disparity penalty value.

In step 336, the value of the variable DISPARITY is altered to indicate an unmatched character, i.e., incremented by the no-match disparity penalty value.

In step 338, the current character pointers associated with variables WORD1 and WORD2, i.e., variables PTR1 and PTR2, are incremented by one. As explained above, and indicated by the diagram, subsequent to execution of step 338, the process is redirected to step 306, where the loop termination conditions are re-evaluated.

Subsequent to completion of the character by character comparison of the expressions stored in the variables WORD1 and WORD2, the process proceeds to step 340. There, the value of the variable DISPARITY is incremented by a multiplicative product of the variable LEN-DIFF and the pre-character length difference penalty value. The value of the variable DISPARITY, resulting from the computation of step 340, corresponds with the disparity value discussed in conjunction with FIG. 4.

In an illustrated preferred English language embodiment, the specific disparity type values are as follows. The deletion error penalty is assigned a value of 450. The penalty value associated with a transposition error is 650. A no-match error is valued at 800. Further, the per character lenth-difference penalty value is 400.

In accordance with the above description, the invention attains the objects set forth. That is, the invention provides an improved database search system which is unaffected by operator error, which can match expressions with differing suffixes, and which operates with sufficient speed for convenient on-line use.

It is intended that all matter in the description and drawings be interpreted as illustrative and not in a limiting sense. For example, organization and content of the database may be altered to more closely match the installation requirements. Certain skeleton-forming steps can also be eliminated or reordered. Further, differing data compression and disparity value calculation techniques can be employed. Those skilled in the art may have changes described in the embodiment, and in other teachings herein, for further practices which are with the scope of the invention described and claimed herein.

APPENDIX I

The UNFLECT Routine

An operating sequence for the suffix stripping routine, UNFLECT, discussed above in conjunction with FIG. 4, is presented below. In the sequence, the variable "Word" represents the input expression which is to be unflected, that is, to have it suffix stripped. The variable "Level" indicates that one or two base form expressions are associated with the input expression. The variable "Possessive" is a flag indicating that the input expression is a possessive noun form. The variable "Test" temporarily stores forms of the input expression. The variable "Base-tag flags" indicates the grammatical classification of the input expression, while the variable "Inflection flags" indicates the inflectional class of the input expression. The variable "Doubled" is a flag indicating whether the stem-final consonant of the input expression is doubled.

Moreover, in the sequence, the function RTVWRDS represents a routine for locating the expression in the dictionary database. The first parameter in the RTVWRDS calling sequence identifies the expression to be located. The second parameter of the calling sequence identifies the level of that expression, i.e., whether it is the first or the second base form of the input expression.

```
Set Level to 1;
If Word is less than 8 letters long,
Then do:
Look it up by calling RTVWRDS(Word,1);
Go to Endit;
End;
If the final two letters of Word are /s'/,
Then do;
Set Possessive flag;
Remove the apostrophe from the end of Word;
End;
Else if the final two letters of Word are /'s/,
Then do;
Set Test to Word minus its final two letters;
Call RTVWRDS(Test,1);
If Test was found in the dictionary,
Then do;
Set Possessive flag;
If Test was found in the special words' dictionary,
Then go to Spex;
If Base-tag flags contain +[noun] or if Word
is +[uninflectable],
```

-continued

```
Then do;
Set Base-tag flags to +[noun] only;
Set Possessive flag;
End;
Else reset to not found;
Go to Endit;
End;
Call RTVWRDS(Word,1);
If Word was found in the dictionary,
Then if Word was found in the special words' dictionary,
Then do;
Spex:
If Possessive flag has been set,
Then do;
Reset Word information to +[possessive];
Modify the transfer pointer to refer to the
correct inflected form;
End;
If Base-flag indicates that a second base form exists,
Then set Level to 2 and get the additional information
from the special words' dictionary;
Go to Endit;
End;
Else do;
If Possessive flag has been set,
Then reset Word information to +[possessive];
If +[uninflectable] or Possessive flag has not been set,
Set Level to 2;
End;
If the final letter of Word is /s/,
Then do;
Set Test to Word minus its final /s/;
Call RTVWRDS(Test,Level);
If Test was found in the dictionary,
Then do;
Set Base-tag flags to -[adjective,adverb];
If Base-Tag flags contain +[noun],
Then if Possessive flag has been set,
Then set Inflection flags to +[plural,possessive];
Else set Inflection flags to +[plural];
If Base-Tag flags contain +[verb],
Then if Possessive flag has not been set,
Then if Inflection flag is +[infinitive],
Then set Inflection flags to
+[third person singular];
Else set Base-tag flags to -[verb];
Else set Base-tag flags to -[verb];:
If Base-Tag flag contain neither +[verb] nor +[noun],
Then reset to not found;
Else go to Endit;
End;
If Test was not found in the dictionary,
Then if the final letter of Test is /e/,
Then do;
Remove the /e/ from the end of Test;
Call RTVWRDS(Test,Level);
If Test was not found in the dictionary,
Then do;
If the last two letters of Test are doubled,
Then do;
Remove the last letter of Test;
Call RTVWRDS(Test,Level);
End;
End;
Else if the final letter of Test is /i/,
Then do;
Replace the final /i/ of Test with /y/;
Call RTVWRDS(Test,Leve!);
End;
End;
If Test was found in the dictionary,
Then do;
Set Base-tag flags to -[adjective,adverb];
If Base-Tag flags contain +[noun],
Then if Possessive flag has been set,
Then set Inflection flags to +[plural,possessive];
Else set Inflection flags to +[plural];
If Base-Tag flags contain +[verb],
Then if Possessive flag has not been set,
Then if Inflection flag is +[infinitive],
Then set Inflection flags to +[third person singular];
Else set Base-tag flags to -[verb];
Else set Base-tag flags to -[verb];
If Base-Tag flags contain neither +[verb] nor +[noun],
Then reset to not found;
End;
Else if the final two letters of Word are /ed/,
Then do;
Set Test to Word minus its final /ed/;
If the final two letters of Test are equal,
Then do;
Set Doubled flag;
Remove the final letter from Test;
End;
Call RTVWRDS(Test,Level);
If Test was found in the dictionary,
Then if the Doubling flag in Base-info and the Doubled flag set above
do not match,
Then reset Test to not found;
Else do;
If Base-tag flags contain +[verb],
Then if Inflection flag is +[infinitive],
Then do;
Set Inflection flags +[past tense,past participle]
Set Base-tag flags to +[verb] only;
If verb is in Class 4,
Then reset to Class 1;
Go to Endit;
End;
Else reset to not found;
Else reset to not found;
End;
If Test was not found in the dictionary,
Then do;
If Doubled flag has been set,
Then double the final letter of Test;
Else if the final letter of Test is /i/,
Then replace it with /y/;
Else add an /e/ to the end of Test;
Call RTVWRDS(Test,Level);
End;
If Test was found in the dictionary
Then if Base-tag flags contain +[verb],
Then if Inflection flag is +[infinitive],
Then do;
Set Inflection flags +[past tense,past participle]
Set Base-tag flags to +[verb] only;
If verb is in Class 4,
Then reset to Class 1;
End;
Else reset to not found;
Else reset to not found;
End;
Else if the final three letters of Word are /ing/,
Then do;
Set Test to Word minus its final three letters;
If the final two letters of Test are equal,
Then do;
Set Doubled flag;
Remove final letter from Test;
End;
Call RTVWRDS(Test,Level);
If Test was found in the dictionary,
Then if the Doubling flag in Base-info and the Doubled flag set above
do not match,
Then reset Test to not found;
Else do;
If Base-tag flags contain +[verb],
Then if Inflection flag is +[infinitive],
Then do;
Set Inflection flags +[present participle];
Set Base-tag flags to +[verb] only;
Go to Endit;
End;
Else reset to not found;
Else reset to not found;
End;
If Test was not found in the dictionary,
Then do;
If Doubled flag has been set,
Then double the final letter of Test;
Else if the final letter of Test is /y/,
Then replace it with /ie/;
```

-continued

```
Else add an /e/ to the end of Test;
Call RTVWRDS(Test,Level);
End;
If Test was found in the dictionary
Then if Base-tag flags contain +[verb],
Then if Inflection flag is +[infinitive],
Then do;
Set Inflection flags +[present participle];
Set Base-tag flags to +[verb] only;
End;
Else reset to not found;
Else reset to not found;
End;
Endit:
Do for Level = 1 and 2;
If the Word corresponding to Level has been found;
Then if it was in the special words' dictionary,
Then get the synonym dictionary information by reference to
SPEXSTR;
Else if it was in the exceptional words' dictionary,
Then if it was not a base form,
Then get the synonym dictionary information by reference to
SPECSTR;
Else go to Setup;
Else go to Setup;
Go to Skipit;
Setup;
Get the synonym dictionary by reference to the main dictionary;
Skipit;
End;
If Word is an uninflectable noun,
Then set Base-tag flags to +[noun];
Else if Word is Verb Class 4 infinitive,
Then set Inflection flags to +[past tense,past participle];
If two equal Words have been found,
Then delete reference to the second one;
Return to calling procedure;
```

APPENDIX II

PARTIALLY IRREGULAR PARADIGM TABLE

| Base Form | Exceptional Inflected Form |
|---|---|
| analysis | analyses |
| antithesis | antitheses |
| apotheosis | apotheoses |
| arise | arisen |
| arise | arose |
| awake | awoke |
| awake | awoken |
| basis | bases |
| bear | bore |
| bear | borne |
| beat | beaten |
| become | became |
| befall | befallen |
| befall | befell |
| beget | begat |
| beget | begotten |
| begin | began |
| begin | begun |
| begird | begirt |
| behold | beheld |
| bend | bent |
| bereave | bereft |
| beseech | besought |
| beseech | beseeched |
| bestride | bestrode |
| bestride | bestridden |
| bid | bidden |
| bind | bound |
| bite | bit |
| bite | bitten |
| bleed | bled |
| blow | blew |
| blow | blown |
| bondsman | bondsmen |
| break | broke |
| break | broken |
| breed | bred |
| bring | brought |
| build | built |
| burn | burned |
| burn | burnt |
| buy | bought |
| catch | caught |
| catharsis | cartharses |
| chide | chidden |
| chide | chided |
| child | children |
| choose | chose |
| choose | chosen |
| churchman | churchmen |
| cleave | cleaved |
| cleave | cleft |
| clergyman | clergymen |
| cling | clung |
| come | came |
| countryman | countrymen |
| creep | crept |
| crisis | crises |
| crow | crew |
| crow | crowed |
| deal | dealt |
| dig | dug |
| dive | dived |
| dive | dove |
| do | did |
| do | done |
| draw | drawn |
| draw | drew |
| dream | dreamed |
| dream | dreamt |
| drink | drank |
| drink | drunk |
| drive | driven |
| drive | drove |
| dwell | dwelled |
| dwell | dwelt |
| eat | ate |
| eat | eaten |
| emphasis | emphases |
| engird | engirt |
| fall | fallen |
| fall | fell |
| feed | fed |
| feel | felt |
| fight | fought |
| find | found |
| flee | fled |
| fling | flung |
| forbear | forbore |
| forbear | forborne |
| forbid | forbade |
| forbid | forbidden |
| foreman | foremen |
| foresee | foresaw |
| foresee | foreseen |
| foretell | foretold |
| forethink | forethought |
| forget | forgot |
| forget | forgotten |
| forgive | forgave |
| forgive | forgiven |
| forsake | forsaken |
| forsake | forsook |
| forswear | forswore |
| forswear | forsworn |
| freshman | freshmen |
| get | got |
| get | gotten |
| gird | girt |
| give | gave |
| give | given |
| go | gone |
| go | went |
| grind | ground |
| grow | grew |

| Base Form | Exceptional Inflected Form |
|---|---|
| grow | grown |
| hang | hanged |
| hang | hung |
| hear | heard |
| heave | heaved |
| heave | hove |
| henchman | henchmen |
| hew | hewed |
| hew | hewn |
| hide | hid |
| hide | hidden |
| hold | held |
| hypothesis | hypotheses |
| keep | kept |
| know | knew |
| know | known |
| lead | led |
| lean | leaned |
| lean | leant |
| leap | leaped |
| leap | leapt |
| learn | learned |
| learn | learnt |
| leave | left |
| lend | lent |
| light | lighted |
| light | lit |
| lose | lost |
| make | made |
| man | men |
| mean | meant |
| meet | met |
| metamorphosis | metamorphoses |
| mislead | misled |
| mistake | mistaken |
| mistake | mistook |
| misunderstand | misunderstood |
| mow | mowed |
| mow | mown |
| outdo | outdid |
| outdo | outdone |
| outthink | outthought |
| outwear | outwore |
| outwear | outworn |
| overcome | overcame |
| overhang | overhung |
| overrun | overran |
| overtake | overtaken |
| overtake | overtook |
| overthrow | overthrew |
| overthrow | overthrown |
| ox | oxen |
| parenthesis | parentheses |
| patrolman | patrolmen |
| plead | pleaded |
| plead | pled |
| policeman | policemen |
| prognosis | prognoses |
| prove | proved |
| prove | proven |
| rend | rent |
| ring | rang |
| ring | rung |
| rise | risen |
| rise | rose |
| run | ran |
| say | said |
| seaman | seamen |
| seek | sought |
| self | selves |
| sell | sold |
| send | sent |
| shake | shaken |
| shake | shook |
| shear | sheared |
| shear | shorn |
| shine | shined |
| shine | shone |
| shoot | shot |
| show | showed |
| show | shown |
| shrink | shrank |
| shrink | shrunk |
| sing | sang |
| sing | sung |
| sink | sank |
| sink | sunk |
| sit | sat |
| slay | slain |
| slay | slew |
| sleep | slept |
| sling | slung |
| smell | smelled |
| smell | smelt |
| smite | smitten |
| smite | smote |
| sow | sowed |
| sow | sown |
| speak | spoke |
| speak | spoken |
| speed | sped |
| spell | spelled |
| spell | spelt |
| spend | spent |
| spill | spilled |
| spill | spilt |
| spin | spun |
| spoil | spoiled |
| spoil | spoilt |
| spokesman | spokesmen |
| spring | sprang |
| spring | sprung |
| stand | stood |
| stasis | stases |
| stave | staved |
| stave | stove |
| steal | stole |
| steal | stolen |
| stick | stuck |
| sting | stung |
| stink | stank |
| stink | stunk |
| strew | strewed |
| strew | strewn |
| stride | stridden |
| stride | strode |
| strike | struck |
| string | strung |
| swear | swore |
| swear | sworn |
| sweep | swept |
| swell | swelled |
| swell | swollen |
| swim | swam |
| swim | swum |
| swing | swung |
| tailor-make | tailor-made |
| take | taken |
| take | took |
| teach | taught |
| tear | tore |
| tear | torn |
| tell | told |
| tenderfoot | tenderfeet |
| thesis | theses |
| thief | thieves |
| think | thought |
| thrive | thrived |
| thrive | throve |
| throw | threw |
| throw | thrown |
| tradesman | tradesmen |
| tread | trod |
| tread | trodden |
| tuberculosis | tuberculoses |
| unbend | unbent |
| unbind | unbound |
| undergo | undergone |
| undergo | underwent |
| understand | understood |

-continued

| Base Form | Exceptional Inflected Form |
|---|---|
| undertake | undertook |
| undertake | undertaken |
| undo | undid |
| undo | undone |
| unwind | unwound |
| uphold | upheld |
| wake | woke |
| wake | woken |
| wear | wore |
| wear | worn |
| weave | wove |
| weave | woven |
| weep | wept |
| win | won |
| wind | wound |
| withdraw | withdrawn |
| withdraw | withdrew |
| withhold | withheld |
| withstand | withstood |
| workingman | workingmen |
| workman | workmen |
| wreak | wrought |
| wring | wrung |
| write | written |
| write | wrote |

FULLY IRREGULAR PARADIGM TABLE

| Base Form | Irregular Inflected Form | Related Base Form |
|---|---|---|
| be | be | |
| | am | |
| | is | |
| | are | |
| | was | |
| | were | |
| | been | |
| | being | |
| being | being | be |
| | being's | |
| | beings | |
| | beings' | |
| have | have | |
| | has | |
| | had | |
| | having | |
| fly | fly | |
| | fly's | |
| | flies | |
| | flies' | |
| | flew | |
| | flown | |
| | flying | |
| foot | foot | |
| | foot's | |
| | foots | |
| | footed | |
| | footing | |
| | feet | |
| | feet's | |
| footing | footing | foot |
| | footing's | |
| | footings | |
| | footings' | |
| lie | lie | |
| | lie's | |
| | lies | |
| | lies' | |
| | lied | |
| | lay | |
| | lain | |
| | lying | |
| lay | lay | lie |
| | lays | |
| | laid | |
| | laying | |

| Base Form | Irregular Inflected Form | Related Base Form |
|---|---|---|
| live | live | |
| | lives | |
| | lived | |
| | living | |
| life | life | |
| | life's | |
| | lives | live |
| | lives' | |
| living | living | live |
| | living'd | |
| | livings | |
| | livings' | |
| see | see | |
| | sees | |
| | saw | |
| | seen | |
| | seeing | |
| saw | saw | see |
| | saw's | |
| | saws | |
| | saws' | |
| | sawed | |
| | sawn | |
| | sawing | |
| seeing | seeing | see |
| | seeing's | |
| | seeings | |
| | seeings' | |

What is claimed is:

1. A digital data processing apparatus for information retrieval, said apparatus comprising
   A. input means for accepting a signal representative of a search linguistic expression in conventional textual reoresentation.
   B database storage means for storing signals representative of plural textual expressions and information pertaining thereto,
   C. database matching means in circuit with said input means and with said database storage means for locating within said database a linguistic expression matching or similar to said search linguistic expression,
   said database matching means including skeletonization means for converting at least one said database linguistic expression to a linguistically salient word skeleton, and for converting said search linguistic expression, or a modified form thereof, to a linguistically salient word skeleton, said converting means comprising
      i. means for eliminating from the word skeleton produced thereby a selected alpha set, if any, of the expression being converted which lacks isomorphy with a phonetic representation of that selected set, and
      ii means for replacing with a different linguistic symbol another selected alpha set, if any, of the expression being converted which lacks isomorphy with a phonetic representation of that other selected set,
   D. output means in circuit with said matching means for generating a signal indicative of the success of locating at least one database linguistic expression matching or similar to said search linguistic expression and for generating signals representative of information pertaining to the matching or similar database linguistic expressions, if any.

2. An apparatus according to claim 1 wherein said database matching means comprises target modification means in circuit with said skeletonization means for executing the steps of
- A. selectively modifying said search word skeleton by replacing a set of one or more skeleton symbols with a different set of such symbols,
- B. comparing said modified search skeleton with a linguistically salient word skeleton of at least one said database linguistic expression, and
- C. selectively repeating said modifying step and said comparing step.

3. An apparatus according to claim 1 wherein said database storage means comprises main dictionary means for storing plural addressable entries each representative of a linguistic expression, each said expression being any one of a base form of a regular paradigm, a base form of a partially irregular paradigm, an exceptional inflected form of a partially irregular paradigm, and an element of a fully irregular paradigm.

4. An apparatus according to claim 3 comprising form-determining means coupled with the database matching means for generating a signal representative of either of a base form or an irregular form of said input expression.

5. An apparatus according to claim 4 in which said form-determining means includes means for determining a suffix of said input expression.

6. An apparatus according to claim 1 comprising comparison means for comparing said search expression with each said matching or similar database expression and for producing a disparity signal numerically representative of differences therebetween.

7. An apparatus according to claim 6 comprising means responsive to the disparity signal associated with each matching or similar database expression for ordering the output of signals representative of each said matching or similar database expression.

8. A method for information retrieval for use with a digital data processing apparatus having database storage means for storing signals representative of plural textual expressions and information pertaining thereto, said method comprising the steps of
- A. accepting an input signal representative of a search linguistic expression in conventional textual reoresentation.
- B. locating within said database a linguistic exoression matching or similar to said search linguistic expression,
    said locating step including the steps of converting at least one said database linguistic expression to a linguistically salient word skeleton, and converting said search linguistic expression, or a modified form thereof, to a linguistically salient word skeleton, each said converting step comprising the steps of
    - i. eliminating from the word skeleton produced thereby a selected alpha set, if any, of the expression being converted which lacks isomorphy with a phonetic representation of that selected set, and
    - ii replacing with a different linguistic symbol another selected alpha set, if any, of the expression being converted which lacks isomorphy with a phonetic representation of that other selected set,
- C. generating for outout a signal indicative of the success of locating at least one database linguistic expression matching or similar to said search linguistic expression and generating for outout signals representative of information pertaining to the matching or similar database linguistic expressions, if any.

9. A method according to claim 8 wherein said locating step further comprises the steps of
- A. selectively modifying said search word skeleton by replacing a set of one or more skeleton symbols with a different set of such symbols,
- B. comparing said modified search skeleton with a linguistically salient word skeleton of at least one said database linguistic expression, and
- C. selectively repeating said modifying step and said comparing step.

10. A method according to claim 8 wherein the locating step comprises a form-determining step for generating a signal representative of either of a base form or an irregular form of said input expression.

11. A method according to claim 10 in which said form-determining step includes the steps of determining a suffix of said input expression.

12. A method according to claim 8 comprising the steps of comparing said search expression with each said matching or similar database expression and producing a disparity signal numerically representative of differences therebetween.

13. A method according to claim 12 comprising the step of responding to the disparity signal associated with each matching or similar database expression for ordering the output of signals representative of each said matching or similar database expression.

* * * * *

UNITED STATES PATENT AND TRADEMARK OFFICE
CERTIFICATE OF CORRECTION

PATENT NO. : 4,674,066
DATED : June 16, 1987
INVENTOR(S) : Henry Kucera

It is certified that error appears in the above-identified patent and that said Letters Patent is hereby corrected as shown below:

Column 3, line 15, after "chauffeur" insert -- . --.

Column 3, line 53, after "expressions" insert -- . --.

Column 4, line 51, after "meaning" insert -- : --.

Column 4, line 55, after " 'to live') " insert -- . --.

Column 9, line 58, replace the number " '1' " with the letter -- "l" --.

Column 10, line 65, replace " 'E is rewritten as' " with -- "E" is rewritten as "O" --.

Column 24, line 34, replace "reoresentation." with -- representation. --.

UNITED STATES PATENT AND TRADEMARK OFFICE
CERTIFICATE OF CORRECTION

PATENT NO. : 4,674,066

DATED : June 16, 1987

INVENTOR(S) : Henry Kucera

It is certified that error appears in the above-identified patent and that said Letters Patent is hereby corrected as shown below:

Column 25, line 44, replace "reoresentation." with -- representation. --.

Column 25, line 45, replace "exoression" with -- expression --.

Column 10, line 20, replace "beginniung" with --beginning--.

Column 10, line 23, replace "begining" with --beginning--.

Signed and Sealed this

Eighth Day of March, 1988

Attest:

DONALD J. QUIGG

*Attesting Officer*  *Commissioner of Patents and Trademarks*